(12) United States Patent
Lim et al.

(10) Patent No.: US 6,820,894 B2
(45) Date of Patent: Nov. 23, 2004

(54) STRUCTURE FOR INSTALLATION A AIR-BAG MODULE ON A STEERING WHEEL

(75) Inventors: Gyu-Sung Lim, Seoul (KR); Ik-Hwan Kim, Chungcheongnam-do (KR); Byong-Ryong Cho, Kyunggi-do (KR); Joon-Ho Kim, Seoul (KR)

(73) Assignee: Hyundai Mobis Co., Ltd., Yongin (KR)

( * ) Notice: Subject to any disclaimer, the term of this patent is extended or adjusted under 35 U.S.C. 154(b) by 80 days.

(21) Appl. No.: 10/330,326

(22) Filed: Dec. 30, 2002

(65) Prior Publication Data

US 2004/0108695 A1 Jun. 10, 2004

(30) Foreign Application Priority Data

Dec. 4, 2002 (KR) .................... 10-2002-0076631

(51) Int. Cl.[7] .................... B60R 21/20; B60R 21/26
(52) U.S. Cl. .................... 280/731; 74/552; 280/736; 280/728.2
(58) Field of Search .................... 280/731, 728.2, 280/736, 742; 74/552; B60R 21/20

(56) References Cited

U.S. PATENT DOCUMENTS 5,066,038 A * 11/1991 Frantom et al. ............ 280/737
6,142,510 A    11/2000 Endo et al.
6,382,661 B1 * 5/2002 Sutherland ............... 280/728.2

FOREIGN PATENT DOCUMENTS

EP   1078824 A1 * 7/2000
JP   9-249088    * 9/1997

* cited by examiner

Primary Examiner—Ruth Ilan
(74) Attorney, Agent, or Firm—Greenblum & Bernstein, P.L.C.

(57) ABSTRACT

Disclosed is a structure for installing an air bag module on a steering wheel, capable of improving operation performance of the air bag module by maximizing space utilization of an interior of the steering wheel, and by minimizing interference between parts. A structure for installing an air bag module on a steering wheel includes: a main body consisting of a rim constituting an outer ring, a core constituting a center portion, a spoke connecting the rim with the core; an inflator mounted on the rim, one end of which is connected with a connector, and to the other end of which a nozzle for discharging a gas, is provided; an air bag for expanding, provided with the gas from the inflator; a cushion housing for receiving the air bag and is fixed to an upper plane of the core; and a pipe tube for sealing surroundings of the nozzle, and connecting the inflator with the housing.

7 Claims, 5 Drawing Sheets

[FIG. 1a] PRIOR ART
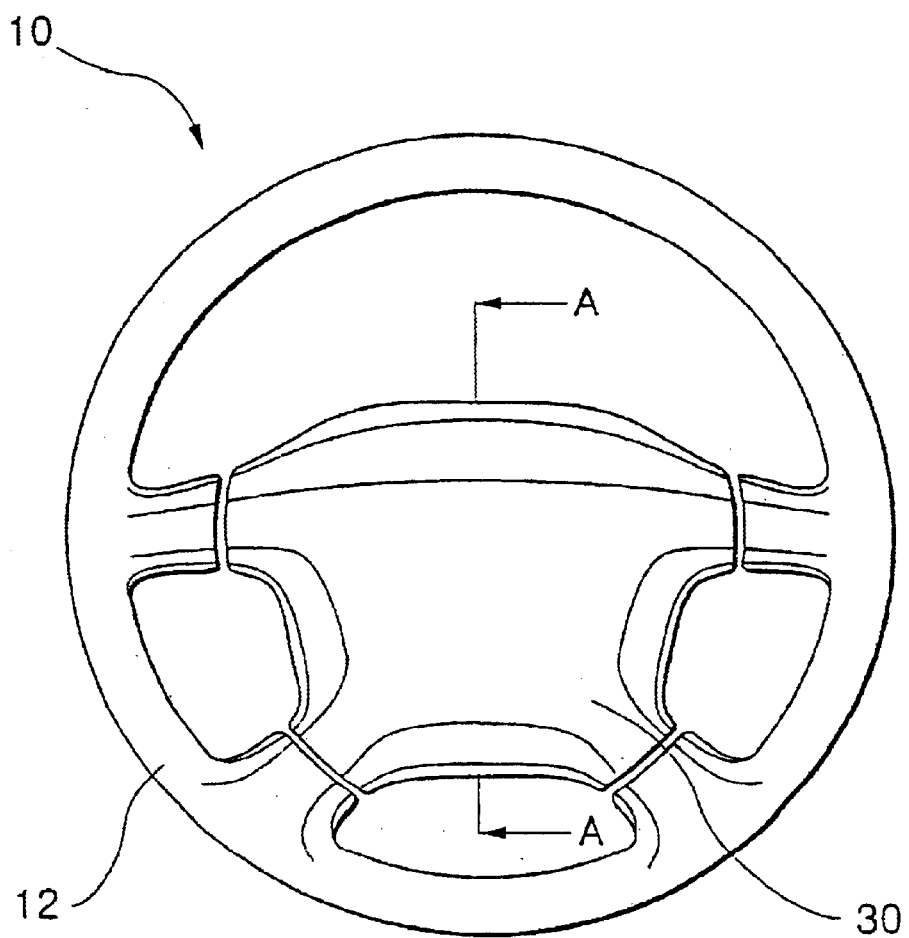

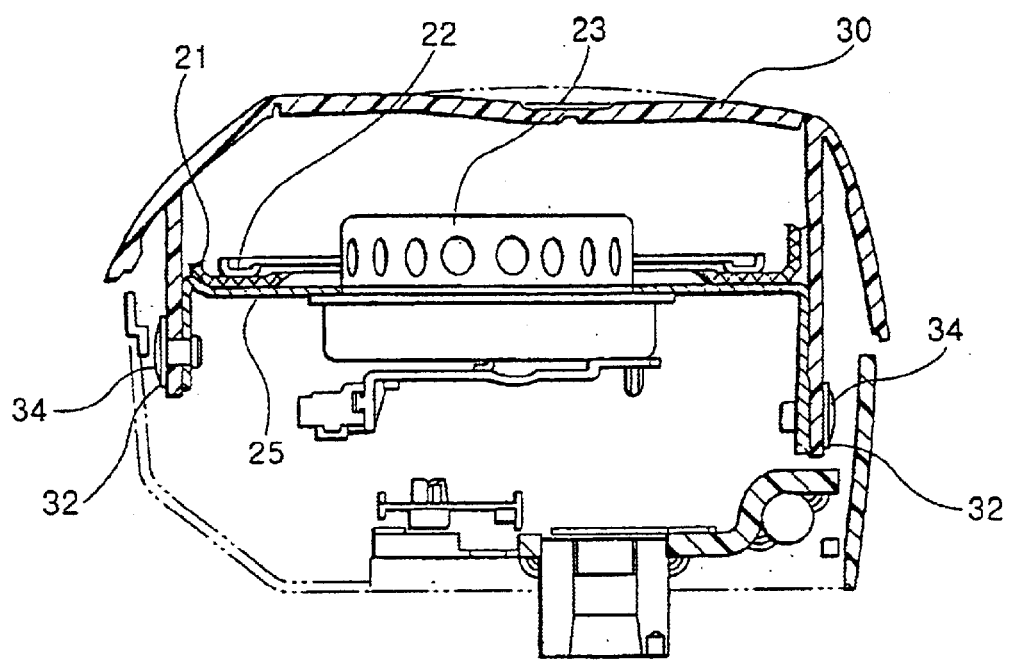
[FIG. 1b] PRIOR ART

[FIG. 1c] PRIOR ART
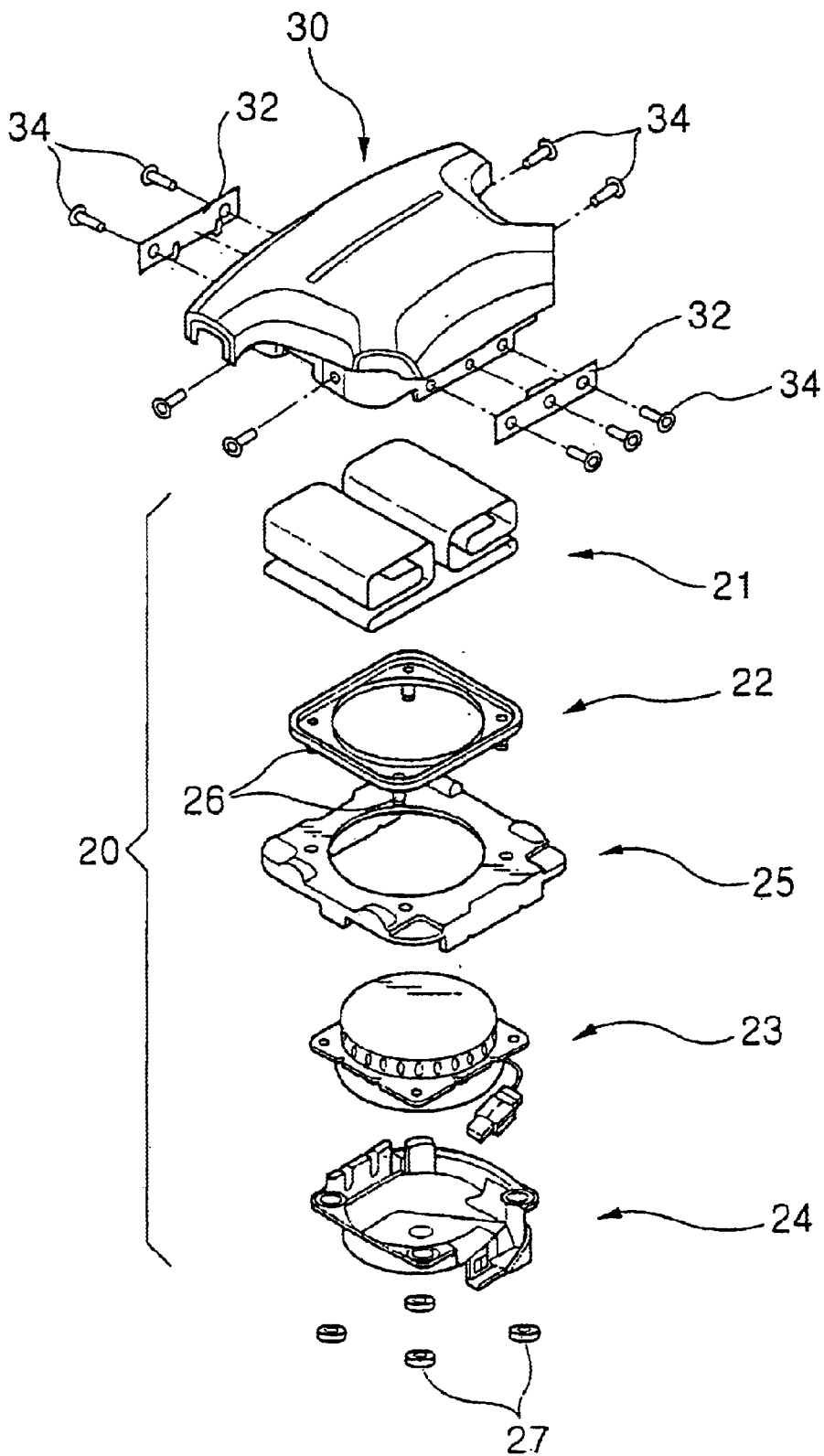

[FIG. 2] PRIOR ART
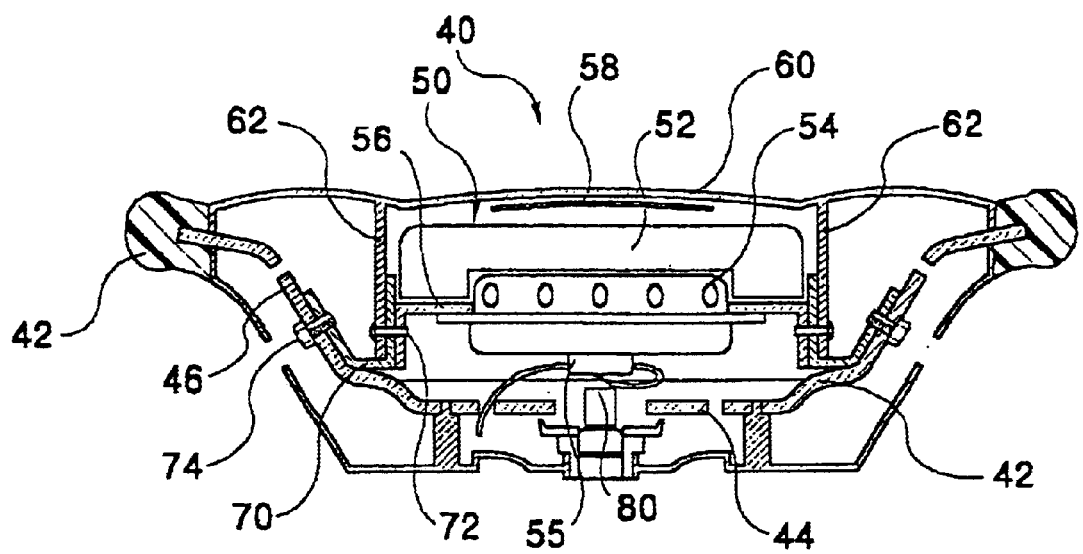
[FIG. 3]
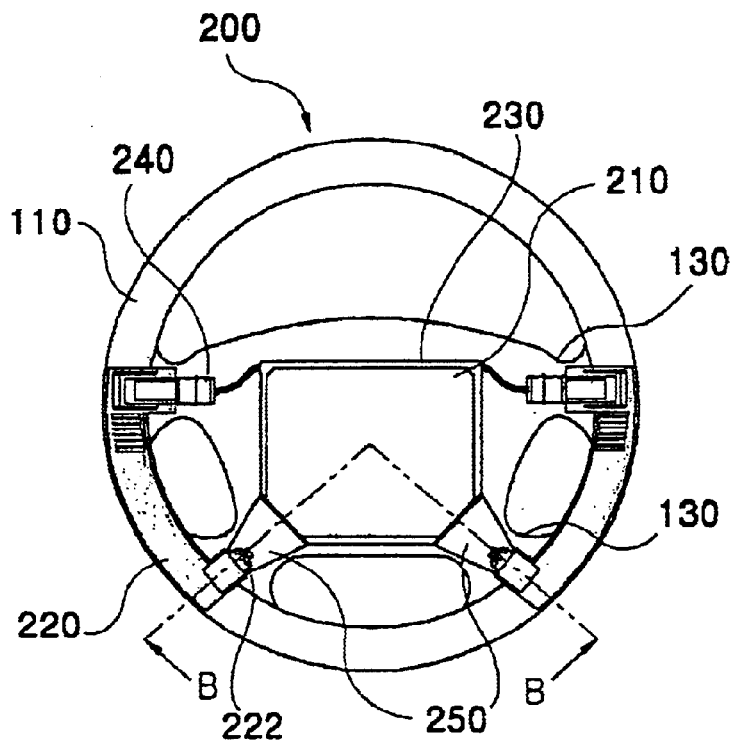

[FIG. 4]
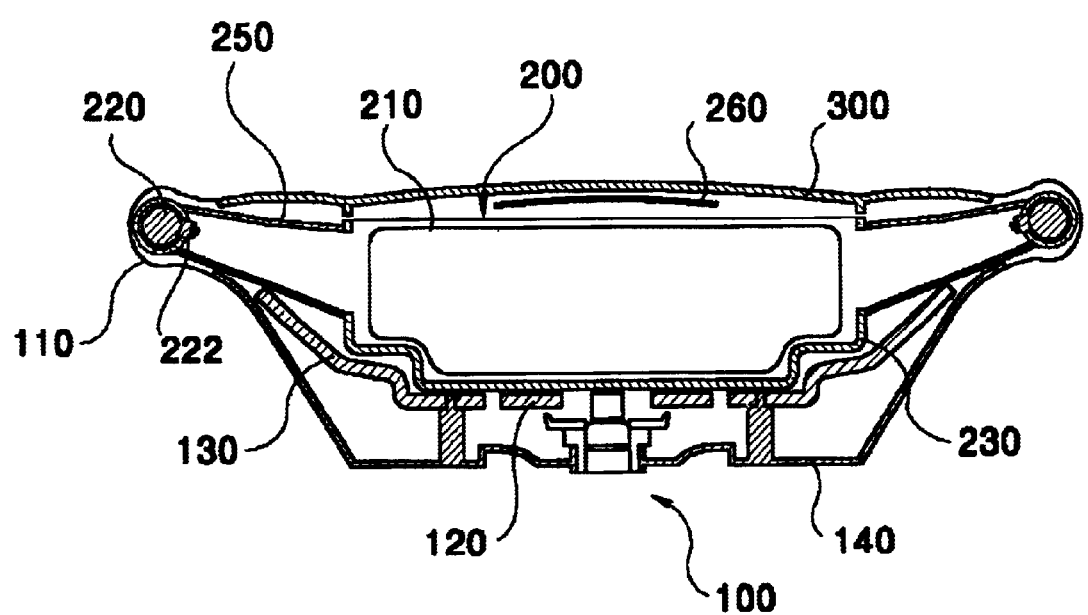

STRUCTURE FOR INSTALLATION A AIR-BAG MODULE ON A STEERING WHEEL

BACKGROUND OF THE INVENTION

1. Field of the Invention

The present invention relates to an air bag module for a vehicle, and more particularly to a structure for installing an air bag module on a steering wheel for a vehicle capable of maximizing space utilization of an interior of the steering wheel, improving operation performance of the air bag module by minimizing interference between parts constituting the air bag module.

2. Description of the Related Art

Generally, an air bag apparatus, which is an apparatus for protecting a passenger upon collision of a vehicle, protects safety of a driver and a passenger, working together with a seat belt.

Such air bag apparatus works in the following manner, in which: when a sensor and an ECU (Electronic Controlling Unit) detect impulse, an inflator is operated instantly. Then a compressed gas is discharged and the air bag is expanded, so that impulse with respect to a face and a chest of a driver, is possibly relieved.

Among such air bag apparatus, particularly a driver air bag is generally mounted on a central part of the steering wheel, so that a danger that a face or a chest of a driver is knocked against the steering wheel due to inertia going forward upon collision of a vehicle, may be prevented.

An U.S. Pat. No. 6,142,510 (Nov. 7, 2000) discloses in detail a structure of steering wheel on which a driver air bag is mounted. The structure thereof will be described in detail in the following.

FIG. 1a is a plan view of a structure for a steering wheel of the related art, and FIG. 1b is a cross-sectional view of a structure taken along line A—A of FIG. 1a. Also, FIG. 1c is an exploded, perspective view illustrating the whole construction of an air bag module in FIG. 1a.

Referring to FIG. 1a through FIG. 1c, the steering wheel 10 roughly consists of a steering wheel main body 12, an air bag module 20 mounted within the main body 12, and an air bag cover 30 for covering the air bag module 20.

Also, the air bag module 20 includes an air bag 21, a retainer 22, an inflator 23, an inflator housing 24, and a base plate 25.

Here, the air bag 21 is fixed on an upper plane of the base plate 25 with the retainer 22 intervened, and the inflator 23 is fit into a back side of the base plate 25 with the inflator 23 accommodated in the inflator housing 24.

With the inflator 23 and inflator housing 24 fit into the base plate 25 as described above, a nut 27 is fixed to a stud bolt 26 formed on the back side of the retainer 22, so that assembling of the air bag module 20 is completed.

The air bag module 20 assembled through the foregoing procedure, with being fit into the back side of the air bag cover 30, is joined to a lateral side of the air bag cover 30 corresponding to a lateral side of the retainer 22 by means of a rivet 34 with a bracket 32 intervened.

After that, an assembly consisting of the air bag module 20 and the air bag cover 30, is mounted on a central front side of the main body 12, so that assembling of the whole steering wheel 10 is completed.

In the meantime, FIG. 2 is another embodiment of the related art, schematically showing a structure in which an air bag module is mounted within a steering wheel.

As shown in FIG. 2, an air bag module 50 consists of an air bag 52, an inflator 54 arranged on a lower portion of the air bag 52, and an inflator housing 56 for receiving the inflator 54.

Also, the steering wheel 40 consists of a rim 42 constituting an outer ring, a core 44 forming a central part, and a spoke 46 connecting the rim 42 with the core 44.

The inflator 54 has a connector 55 for electrically connecting with a controlling unit connected with an impulse detecting sensor within a vehicle, and a horn switch 58 is mounted on an upper portion of the air bag 52.

The air bag module 50 accommodated in an inside of a side wall part 62 of the air bag cover 60, is joined integrally to the air bag cover 60 by means of a rivet 72 with an inflator housing 56, the air bag cover 60, and a bracket 70 faced each other.

The air bag cover 60 has a side wall part 62 projected vertically downward a predetermined length from the back side of the air bag cover 60, for receiving the air bag module 50, and the air bag cover 60 positioned within the side wall part 62 has, in its back side, a tear line (not shown) of a predetermined shape for exploding upon expansion of the air bag 52.

One end of the bracket 70 is bent outward, for coming in plane contact with a front side of the spoke 46 as shown in FIG. 2, so that this bent portion is fixed to the spoke 46 by means of a bolt 74.

As is revealed in the foregoing construction, the air bag module of the related art is configured such that the air bag cover 60, the horn switch 58, the air bag 52, the inflator 54, and the connector 55 are sequentially assembled. As the air bag module 50 consisting of combination of a plurality of parts, should be mounted in a limited space within the steering wheel 40, the size of the air bag module 50 itself is reduced, whereby space for receiving the air bag 52 becomes insufficient and interference with surrounding parts is generated upon unfolding of the air bag 52. Resultantly, such problems cause deterioration in unfolding performance of the air bag 52.

Also, as space for operation of the horn switch 58 is narrow and interference with other parts is generated, a problem that malfunction of the horn switch 58 is generated, emerges.

Additionally, due to interference between the connector 55 connected with a lower end of the inflator 54 and an end terminal of a steering wheel shaft 80 positioned on a lower part of the connector 55, a short circuit phenomenon of the connector 55 is frequently generated, whereby the air bag 52 is not properly operated.

In order to resolve such problems, the inflator 54 within the air bag module 50 should be changed in its specification, and replaced by an inflator of small capacity. But, such measure may cause undesirable results having great effect on operation performance of the air bag module 50.

SUMMARY OF THE INVENTION

To solve the above-indicated problems, it is, therefore, an object of the present invention to provide a structure for installing an air bag module on a steering wheel for a vehicle capable of improving rigidity of the steering wheel by making change of a core shape possible while improving unfolding performance of the air bag by suppressing interference between parts within the air bag module and by installing the inflator in an interior of the rim of the steering wheel, achieving integration.

The foregoing and other objects and advantages are realized by providing a structure for installing an air bag module on a steering wheel for a vehicle including: a main body consisting of a rim constituting an outer ring, a core constituting a central part, a spoke connecting the rim with the core; an inflator mounted on the rim, one end of which is connected with a connector, and to the other end of which a nozzle for discharging a gas, is provided; an air bag for expanding, provided with the gas from the inflator; a cushion housing for receiving the air bag and is fixed to an upper plane of the core; and a pipe tube for sealing surroundings of the nozzle, and connecting the inflator with the housing; in which the inflator is installed in an interior of the rim.

BRIEF DESCRIPTION OF THE DRAWINGS

The above objects, features and advantages of the present invention will become more apparent from the following detailed description when taken in conjunction with the accompanying drawings, in which:

FIG. 1a is a front view of a steering wheel to which an air bag module of the relater art is provided;

FIG. 1b is a cross-sectional view of a structure, taken along line A—A in FIG. 1a;

FIG. 1c is an exploded, perspective view of the whole structure of the air bag module in FIG. 1a;

FIG. 2 is a cross-sectional view schematically illustrating a structure for installing an air bag module in an interior of a steering wheel according to another embodiment of the related art;

FIG. 3 is a plan view schematically illustrating a structure for installing an air bag module in an interior of a steering wheel according to an embodiment of the present invention;

FIG. 4 is a cross-sectional view schematically illustrating a structure, taken along line B—B in FIG. 3.

DETAILED DESCRIPTION OF THE PREFERRED EMBODIMENT

A preferred embodiment of the present invention will now be described with reference to the accompanying drawings.

FIG. 3 is a plan view schematically illustrating a structure for installing an air bag module in an interior of a steering wheel according to an embodiment of the present invention, and FIG. 4 is a cross-sectional view schematically illustrating a structure, taken along line B—B in FIG. 3.

Referring to FIG. 3 and FIG. 4, a steering wheel main body 100 includes: a rim 110 constituting an outer ring of the main body 100, a core 120 constituting a central part, a spoke 130 connecting the rim 110 with the core 120.

An air bag module 200 is mounted on an upper part of the main body 100. The air bag module 200 includes an air bag 210, an inflator 220 generating a gas, providing the same to the air bag 210, and a housing 230 receiving the air bag 210.

The inflator 220 is provided to an interior of the rim 110. At the moment, one single inflator may be provided, but, preferably, a pair of inflators is provided to right and left sides in the interior of the rim 110 so that the inflator is incorporated into the rim. In order for such construction, of course, a space for accommodating the inflator 220 is formed in the interior of the rim 110 though not shown in the drawing.

Also, the inflator 220 is electrically connected with a controlling unit (not shown) for receiving a signal from an impulse detecting sensor (not shown) provided to an interior of a vehicle, and the inflators 220 at right and left sides have the same specification (capacity).

At the moment, in the present embodiment, the inflators 220 provided to right and left sides of the rim 110 have the same specification, but may have different specification for right and left sides.

If the inflators 220 have different specification for right and left sides, absolute amount of working gas flowing into an interior of the air bag 210, is possibly adjusted and changed, and also it may be configured such that sequential timing signal is applied under the control of the controlling unit so that each inflator 220 is sequentially ignited with a predetermined time interval intervened. Through such construction, step-by-step expansion of the air bag becomes possible and damage inflicted on a passenger is possibly minimized.

In the meantime, the inflator 220 has, in its one end, a nozzle 220 so that a gas generated through a combustion process in the inside may be discharged to the outside through the nozzle 222, and the inflator 220 has, in its other end, a connector 240 for maintaining electrical connection with the controlling unit (not shown) in the outside.

At the moment, the nozzle 222 portion of the inflator 220 and the connector 240 portion are preferably arranged on the spoke 130 of the main body 100 so that they are not exposed to the outside.

According to the foregoing embodiment, a pair of the inflators 220 is adopted in the interior of the rim 110, and there is no limitation in a number of inflators 220 installed in the rim 110.

With such construction, if impulse is detected through the impulse detecting sensor (not shown) upon collision of a vehicle, a signal is transferred to the controlling unit, and the controlling unit applies an ignition signal to the inflator 220 through the connector 240 so that a gas generating agent provided to an interior of the inflator 220, is burned. Also, the generated gas by burning of the gas generating agent is discharged through the nozzle 222, and expands the air bag 210.

In the meantime, the housing 230 is fixed in an upper plane of the core 120 by means of an appropriate fixing means such as welding or screw joining. At the moment, the back side of the housing 230 is preferably configured such that the shape of the back side corresponds to that of the upper plane of the core 120, whereby structurally strong fixing state is maintained.

Also, a space portion of a predetermined area is formed in an interior of the housing 230, and the air bag 210 is received through this space portion. At the moment, as the inflator is not provided to the interior of the housing 230 as was in the related art, the space occupied by the inflator is naturally secured, so that the size and shape of the housing 230 could be more freely designed, and at the same time, the size of the air bag 210 could be freely changed and mounted.

When degree of freedom for the housing 230 is improved, design change for the core 120 is possibly made with consideration of the shape and the size of the housing 230.

Namely, as the shape of the core 120, which has been limited due to the size of the air bag module itself, is freely changed to some extent, structural rigidity of the core 120 is increased, so that structural rigidity of the steering wheel main body 100 is increased much more.

Additionally, as the core 120 and the housing 230 are freely changed in their shape and design, mutual interference between the core 120 and the housing 230 is possibly suppressed to some extent upon mounting of the air bag module 200.

In the meantime, the pipe tube 250 for accommodating flow of the gas, is provided between the inflator 220 and the housing 230 so that the gas generated from the inflator 220 flows into the interior of the housing 230.

More specifically, one end of the pipe tube 250 is connected to the inflator 220 in the side of the nozzle 222, for sealing the surroundings of the nozzle, and the other end of the pipe tube 250 is connected to the housing 230.

At the moment, as the nozzle 222 is designed to be arranged on the spoke 130, it is preferable that the pipe tube 250 naturally runs through the housing 230 along the spoke 130 lest the pipe tube 250 should be exposed to the outside. Also, the connection portion where the inflator 220 and the housing 230 are touched with each other, is joined by means of welding means so that complete sealing is made.

In the meantime, as mentioned above, in case that the air bag module 200 is mounted in an interior of the main body 100, an air bag cover 300 is joined to the main body 100, for covering the air bag module 200.

At the moment, though not shown, tear line is formed on a central part in the back side of the air bag cover 300 so that the tear line may be exploded to a predetermined shape by expanding force upon expansion of the air bag 210.

Also, a horn switch 260 having a shape where resonance plate is attached to a circular metal plate, for generating a warning sound upon contact of the switch, is mounted on the lower part of the air bag cover 300, and the lower space ranging from the spoke 130 and the core 120 of the main body, is covered with a back side cover 140.

Operation of the present invention will be described in the following.

First of all, upon collision of a vehicle, impulse is detected by the impulse detecting sensor and a signal is transferred to the controlling unit, and the controlling unit transmits an ignition signal to the inflator 220 through the connector 240 in response thereto.

When the ignition signal is applied to the inflator 220 through the above procedures, the gas generating agent (not shown) in the inside is exploded and burned, so that a predetermined compressed gas is generated, and the generated compressed gas in this manner is discharged through the nozzle 222, instantly flowing into the interior of the housing 230 by way of the pipe tube 250, whereby the air bag 210 is expanded to a predetermined shape. At the moment, the expanding air bag 210 tears off the tear line, getting out of the air bag cover 300, being unfolded in a predetermined shape, whereby operation of the air bag is completed.

According to the present invention described in the foregoing, the following effects are expected.

Firstly, the inflator is installed in and incorporated into the interior of the rim in the steering wheel, so that the space for accommodating the inflator is secured in the existing lower portion of the air bag and malfunction due to mutual interference between parts constituting the air bag module, is possibly minimized.

Secondly, the connection portion of the pipe tube for enclosing the connection portion of the connector and nozzle in the inflator, is arranged on the spoke of the main body, so that deterioration in appearance and operation performance due to exposure of them to the outside, is prevented in advance.

Thirdly, as inner space within the housing is secured, degree of freedom in designing the shape and the size of the housing, is increased, and at the same time, also the size of the air bag could be freely changed and adopted.

Fourthly, as the degree of freedom in designing the housing is improved, the shape of the core is also possibly changed, so that the structural rigidity of the steering wheel main body could be remarkably improved thanks to design change of the core. Also, delinquency in mounting of the air bag module caused by interference due to an error in shape between the core and the housing of the related art, could be prevented in advance.

Fifthly, the connection portion of the pipe tube facing the inflator and the housing, is joined by means of a welding means, so that a gap generation in the joining portion, is suppressed. Therefore, leakage of the gas generated from the inflator to the outside, could be prevented.

Sixthly, thanks to position change of the inflator, the wide space for installing the air bag is secured, and the space for receiving the air bag could be positioned lower, so that malfunction of the horn switch caused due to the narrow installing space of the related art, could be prevented in advance.

Seventhly, thanks to position change of the inflator, the whole installing height for the air bag module mounted in the interior of the steering wheel, could be reduced.

Eighthly, interference between the connector provided to the lower end of the inflator of the related art and the end terminal of the steering wheel shaft, could be eliminated by the roots, so that such interference does not have any effect whatsoever on deterioration in operation performance of the air bag.

Ninthly, a plurality of inflators having a variety of specifications is installed in the interior of the rim in the steering wheel, so that gas output pressure flowing into the inside of the air bag is easily adjusted and changed. Also, it may be configured such that gas generation from the inflator sequentially occurs with a predetermined time interval intervened under an appropriate control for the inflator by the controlling unit, so that step-by-step expansion of the air bag becomes possible and damage inflicted on a passenger could be minimized.

What is claimed is:

1. A structure for installing an air bag module on a steering wheel for a vehicle comprising:
   a main body including a rim constituting an outer ring, a core constituting a central part, a spoke connecting the rim with the core;
   an inflator mounted on the rim, one end of the inflator being connected with a connector, the other end of the inflator being connected with a nozzle for discharging a gas;
   an air bag provided with the gas from the inflator;
   a cushion housing that receives the air bag and is fixed to an upper plane of the core; and
   a pipe tube that seals surroundings of the nozzle, and connects the inflator with the housing, wherein the inflator is installed in an interior of the rim.

2. The structure according to claim 1, wherein a plurality of the inflators are installed in an interior of the rim and each inflator is under control of a controlling unit.

3. The structure according to claim 2, wherein each of the inflators has different capacities, respectively.

4. The structure according to claim 1, wherein the pipe tube is installed on the spoke.

5. The structure according to claim 1, wherein the connector is installed on the spoke.

6. The structure according to claim 2, wherein the pipe tube is installed on the spoke.

7. The structure according to claim 2, wherein the connector is installed on the spoke.

* * * * *